United States Patent
Ikari et al.

(10) Patent No.: US 11,492,294 B2
(45) Date of Patent: Nov. 8, 2022

(54) METHOD FOR PREPARING CERAMIC MOLDED BODY FOR SINTERING AND METHOD FOR PRODUCING CERAMIC SINTERED BODY

(71) Applicant: Shin-Etsu Chemical Co., Ltd., Tokyo (JP)

(72) Inventors: Masanori Ikari, Annaka (JP); Takuto Matsumoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 784 days.

(21) Appl. No.: 16/408,739

(22) Filed: May 10, 2019

(65) Prior Publication Data

US 2019/0345067 A1 Nov. 14, 2019

(30) Foreign Application Priority Data

May 11, 2018 (JP) .............................. JP2018-092085
Apr. 8, 2019 (JP) .............................. JP2019-073264

(51) Int. Cl.
| C04B 35/443 | (2006.01) |
| B28B 1/20 | (2006.01) |
| C04B 35/626 | (2006.01) |
| C04B 35/634 | (2006.01) |
| C04B 35/645 | (2006.01) |
| C04B 35/638 | (2006.01) |
| C04B 35/44 | (2006.01) |
| C04B 35/01 | (2006.01) |
| C04B 35/553 | (2006.01) |
| C04B 35/565 | (2006.01) |

(52) U.S. Cl.
CPC .............. *C04B 35/443* (2013.01); *B28B 1/20* (2013.01); *C04B 35/44* (2013.01); *C04B 35/62625* (2013.01); *C04B 35/634* (2013.01); *C04B 35/638* (2013.01); *C04B 35/63416* (2013.01); *C04B 35/6455* (2013.01); *C04B 2235/3222* (2013.01); *C04B 2235/3418* (2013.01); *C04B 2235/602* (2013.01); *C04B 2235/604* (2013.01); *C04B 2235/606* (2013.01); *C04B 2235/658* (2013.01); *C04B 2235/6581* (2013.01); *C04B 2235/662* (2013.01); *C04B 2235/763* (2013.01)

(58) Field of Classification Search
CPC .......... C04B 2235/604; C04B 35/6455; C04B 2235/662; B28B 1/20
See application file for complete search history.

(56) References Cited

U.S. PATENT DOCUMENTS

| 5,914,086 A * | 6/1999 | Hermann ................ C03B 11/00 |
| | | 264/650 |
| 2016/0201222 A1* | 7/2016 | Ikari ........................ G02F 1/09 |
| | | 117/6 |
| 2017/0107155 A1 | 4/2017 | Matsuda et al. |
| 2017/0174574 A1* | 6/2017 | Matsushima ......... C04B 35/115 |

FOREIGN PATENT DOCUMENTS

| JP | 54-14352 B2 | 6/1979 |
| JP | 61-124503 A | 6/1986 |
| JP | 2858972 B2 | 2/1999 |
| JP | 2014-57021 A | 3/2014 |
| JP | 5523431 B2 | 6/2014 |
| WO | 2012/060402 A1 | 5/2012 |

OTHER PUBLICATIONS

"S-LEC Tg (Glass transition temperature) and Hydroxyl content." undated. [retrieved Feb. 28, 2022], Retrieved from the Internet: <URL: https://www.sekisui.co.jp/cs/eng/products/slec//datasheet/1323409_33178.html>. (Year: 2022).*
Kusakabe et al. Crystallisation of hydroxyapatite in phosphorylated poly(vinyl alcohol) as a synthetic route to tough mechanical hybrid materials. Materials Science and Engineering C 70 (2017) 487-493. (Year: 2017).*

* cited by examiner

*Primary Examiner* — Erin Snelting
(74) *Attorney, Agent, or Firm* — WHDA, LLP

(57) ABSTRACT

A method includes molding a raw material powder containing a ceramic powder and a thermoplastic resin having a glass transition temperature higher than room temperature into a shape by isostatic pressing and in which a raw material powder slurry is prepared by adding the ceramic powder and the thermoplastic resin to a solvent so that the thermoplastic resin is 2% by weight or more and 40% by weight or less with respect to a total weight of the ceramic powder and the thermoplastic resin, a cast-molded body is to formed by wet-casting the raw material powder slurry into a shape, dried, and subjected to first-stage isostatic press molding at a temperature lower than the glass transition temperature of the thermoplastic resin, then this first-stage press-molded body is heated to the glass transition temperature of the thermoplastic resin or above, and warm isostatic press (WIP) molding is performed.

22 Claims, No Drawings

METHOD FOR PREPARING CERAMIC MOLDED BODY FOR SINTERING AND METHOD FOR PRODUCING CERAMIC SINTERED BODY

CROSS-REFERENCE TO RELATED APPLICATION

This non-provisional application claims priority under 35 U.S.C. § 119(a) on Patent Application Nos. 2018-092085 and 2019-073264 filed in Japan on May 11, 2018 and Apr. 8, 2019, respectively, the entire contents of which are hereby incorporated by reference.

TECHNICAL FIELD

The present invention relates to a method for preparing a ceramic molded body for sintering in which the residual voids are small and the amount thereof is also decreased by achieving both pressure transmission and plastic flow at the time of molding and a method for producing a ceramic sintered body using a molded body fabricated by this fabrication method.

BACKGROUND ART

In general, it is preferable to be able to diminish residual bubbles inside the sintered body of any ceramic since the mechanical strength, thermal conductivity, optical transparency, electrical characteristics, long-term reliability, and the like are improved. Hitherto, as a method of fabricating thick ceramics with high yield, a method in which powder is press-molded has been widely used. As the most classical method, There are a method in which cold isostatic press (CIP) molding is performed after uniaxial pressing and a method in which a raw material powder is filled in a rubber die or the like and directly subjected to CIP molding, and these methods have been industrially widely utilized to this day. Incidentally, for the purpose of improving the shape retaining property at the time of molding and preventing cracking at the time of molding and sintering, thermoplastic resins (so-called binders) are often mixed in the ceramic powder starting materials (raw material powders).

When this step of mixing and adding a thermoplastic resin to the raw material powder is used, it is possible to increase the crushing strength of secondary-aggregated raw material powder and granular raw material in the case of being granulated, to sufficiently transmit the pressure to the interior of the molded body when press-molding thick ceramics, and thus to improve the molding density. Furthermore, it is possible to improve the shape retaining property of the molded body and thus to prevent cracking and deformation in the subsequent steps. In this way, it is possible to mold a molded body having a relatively high molding density into an intended shape with high yield. However, on the other hand, there are also problems that the plastic flow of the raw material powder and raw material granules at the time of uniaxial pressing and CIP molding is hindered, and a large internal residual stress is generated at the time of molding or bridging of the raw material powder and an intergranular voids are induced. For this reason, it is known that residual stress and residual bubbles are present in the interior and various properties are thus diminished in a case in which the molded body is densified by sintering and the like.

Hence, as a method of improving the plastic flowability of the thermoplastic resin mixed with and added to the ceramic powder raw material and thus promoting the densification at the time of ceramic molding, warm isostatic press (WIP)) molding is proposed. For example, Patent Document 1 (JP 2858972) discloses a method of producing a ceramic molded body, in which the temperature is raised to a temperature region in which the thermoplastic resin is thermally softened at the time of isostatic pressing in a case in which a ceramic powder is mixed with a thermoplastic resin, this mixture is subjected to primary molding, formation of a rubber film, and secondary isostatic press molding or this mixture is directly placed in a rubber die or the like and subjected to isostatic press molding. Moreover, an isostatic pressing apparatus capable of raising and adjusting the temperature to a temperature region in which the thermoplastic resin is thermally softened is called "Warm Isostatic Press (W.I.P)".

Incidentally, a warm isostatic pressing apparatus for uniformly heating the entire powder at a low temperature, so-called WIP apparatus itself, has been known from significantly long ago and can be confirmed, for example, in well-known literatures such as Patent Document 2 (JP-B S54-14352). In addition, an external circulation heating type WIP apparatus improved to have a more practical structure is also disclosed in Patent Document 3 (JP-A S61-124503).

The molding technology of ceramics mixed with a thermoplastic resin using such a WIP apparatus has been later applied as a technology for a pressure bonding step of laminated ceramics. For example, Patent Document 4 (WO 2012/060402) discloses an example in which a warm isostatic pressing (WIP) can be utilized and a known example in which thermocompression bonding is performed at a temperature of 80° C. and a pressure of 1 ton as a method of molding a laminated green sheet of an all-solid-state battery. Alternatively, Patent Document 5 (JP-A 2014-57021) discloses an embodiment of performing warm isostatic pressing (WIP) and exemplifies a form in which a laminated sheet is preheated to a predetermined temperature in a vacuum-packed state and then subjected to warm isostatic pressing at a temperature of 70° C. as a method of press molding a laminated ceramic electronic component such as a laminated ceramic capacitor.

However, when the thermoplastic resin is pressed in a state of being heated at the glass transition temperature or higher, there is generally a problem that plastic deformation and plastic flow dominantly occur and the force for transmitting the applied pressure to the interior of the molded body is extremely weakened. For this reason, even a raw material powder of which the shape retaining property and crushing strength are enhanced and the pressure transmitting property is improved by specially mixing and adding a thermoplastic resin, there is a fatal defect that pressure transmission to the interior of the molded body is rapidly attenuated and, in particular, a large amount of voids rather remain inside the thick molded body by performing the WIP treatment.

For this reason, although the WIP apparatus itself has been known from significantly long ago, the WIP apparatus is only utilized when fabricating a (thin) sheet molded body having a thin thickness as described above, and there has been scarcely an example in which WIP is utilized as a molding technology of thick ceramics since Patent Document 1 described above.

In addition, there is also known a cast molding method and an extrusion molding method in which a ceramic raw material is wet-kneaded with a thermoplastic resin and formed into a slurry and the slurry is molded while being wet in addition to a dry raw material. The wet-molded bodies molded by these molding methods tend to be quite favorable molded bodies already having fewer coarse voids after this step. For this reason, it has been judged that this is sufficient, and there has not been found a known example in which these molded bodies are further subjected to after-press molding.

However, the ceramic sintered bodies produced by the conventional methods by the cast molding method and the like as described above are also required to be further improved in various properties such as optical transparency.

Incidentally, Patent Document 6 (JP 5523431) exemplifies an embodiment, but it is exemplified that any one of press molding of uniaxial press molding, cold isostatic pressing (CIP), warm isostatic pressing (WIP), and hot isostatic pressing (HIP) of isostatic pressing, or isostatic pressing after uniaxial press molding is arbitrarily selected as a method of molding a raw material powder, and it is also exemplified that the method may be die molding such as extrusion molding and cast molding as an example other than these. However, particular description in which the former molding step and the latter molding step are combined has not been found. In addition, the knowledge on how the process acts on the properties of the molded body when a wet-molded body by a cast molding method and the like is further subjected to CIP molding or WIP molding thereafter has not been found in the prior art.

CITATION LIST

Patent Document 1: JP 2858972
Patent Document 2: JP-B S54-14352
Patent Document 3: JP-A S61-124503
Patent Document 4: WO 2012/060402
Patent Document 5: JP-A 2014-57021
Patent Document 6: JP 5523431

SUMMARY OF THE INVENTION

The present invention has been made in view of the above-mentioned circumstances, and an object thereof is to provide a method for preparing a ceramic molded body for sintering, by which it is possible to fabricate a dense ceramic sintered body having favorable various properties that the residual voids are significantly small and the ceramic sintered body does not have residual stress and a method for producing a ceramic sintered body, in which a ceramic molded body fabricated by the method for preparing a ceramic molded body for sintering is used.

In order to achieve the above object, the present invention provides the following method for preparing a ceramic molded body for sintering and the following method for producing a ceramic sintered body.

1. A method for preparing a ceramic molded body for sintering which is molded by isostatic pressing a raw material powder containing a ceramic powder and a thermoplastic resin having a glass transition temperature higher than room temperature into a predetermined shape, the method comprising the steps of:

preparing a raw material powder slurry by adding the ceramic powder and the thermoplastic resin to a solvent so that the thermoplastic resin is present in an amount of 2% by weight or more and 40% by weight or less based on the total weight of the ceramic powder and the thermoplastic resin;

molding a cast-molded body by wet-casting the raw material powder slurry into a predetermined shape and drying;

molding a first-stage press-molded body by isostatic pressing the dried cast-molded body at a temperature lower than the glass transition temperature of the thermoplastic resin as first-stage isostatic press molding; and molding a ceramic molded body by warm isostatic pressing (WIP) the first-stage press-molded body with heating its body up to a temperature equal to or higher than the glass transition temperature of the thermoplastic resin as second-stage isostatic press molding.

2. The method according to 1, wherein the first-stage isostatic press molding is cold isostatic press (CIP) molding.

3. The method according to 1, wherein after molding the first-stage press-molded body, heating of the first-stage press-molded body is started while a first-stage isostatic pressing state is maintaining and subsequently WIP molding is performed as the second-stage isostatic press molding.

4. The method according to any one of 1 to 3, wherein a pressing medium in the WIP molding is water or oil.

5. The method according to any one of 1 to 4, wherein the thermoplastic resin has a glass transition temperature higher than room temperature and lower than a boiling point of a pressing medium in WIP molding.

6. The method according to any one of 1 to 5, wherein the thermoplastic resin is at least one selected from the group consisting of polyvinyl alcohol, polyvinyl acetate, a copolymer of polyvinyl alcohol and polyvinyl acetate, methyl cellulose, ethyl cellulose, polyvinyl butyral, polyvinyl propionate, and a copolymer of polyvinyl alcohol and polyvinyl propionate.

7. The method according to any one of 1 to 6, wherein the cast-molded body is molded through solid-liquid separation of the raw material powder slurry by centrifugal cast molding.

8. A method for producing a ceramic sintered body, the method comprising the steps of sintering a ceramic molded body prepared by the method for preparing a ceramic molded body for sintering according to any one of 1 to 7 in an inert atmosphere or in a vacuum, and further hot isostatic pressing (HIP) the sintered ceramic molded body.

9. The method according to 8, further comprising the step of degreasing the ceramic molded body before sintering.

10. The method according to 8 or 9, further comprising the step of annealing the HIP treated body after the HIP treating.

Advantageous Effects of the Invention

According to the present invention, it is possible to effectively achieve both pressure transmission to the interior of the molded body and plastic flow of the thermoplastic resin when press-molding a ceramic molded body, particularly a thick ceramic molded body, and to fabricate a dense ceramic molded body in which the residual voids are significantly small and the residual stress is eliminated. In addition, it is possible to fabricate a ceramic sintered body having a truly high density and significantly few residual bubbles by sintering this ceramic molded body. As a result, it is possible to provide a high-quality ceramic sintered body which exhibits improved mechanical strength, thermal conductivity, optical transparency and the like and thus exhibits more favorable properties than those in the prior art.

DESCRIPTION OF THE PREFERRED EMBODIMENT

Method for Preparing Ceramic Molded Body for Sintering

Hereinafter, the method for preparing a ceramic molded body for sintering according to the present invention is described. Incidentally, room temperature herein is the environmental temperature in the step of molding the ceramic molded body for sintering and is normally 25±5° C.

The method for preparing a ceramic molded body for sintering according to the present invention is a method for preparing a ceramic molded body for sintering which is molded by isostatic pressing a raw material powder containing a ceramic powder and a thermoplastic resin having a glass transition temperature higher than room temperature into a predetermined shape, characterized in that the method comprises the steps of preparing a raw material powder slurry by adding the ceramic powder and the thermoplastic resin to a solvent so that the thermoplastic resin is present in an amount of 2% by weight or more and 40% by weight or less based on the total weight of the ceramic powder and the thermoplastic resin; molding a cast-molded body by wet-casting the raw material powder slurry into a predetermined shape and drying; molding a first-stage press-molded body by isostatic pressing the dried cast-molded body at a temperature lower than the glass transition temperature of the thermoplastic resin as first-stage isostatic press molding; and molding a ceramic molded body by warm isostatic pressing (WIP) the first-stage press-molded body with heating its body up to a temperature equal to or higher than the glass transition temperature of the thermoplastic resin as second-stage isostatic press molding.

Hereinafter, the details of the present invention are described.

Raw Material Powder Slurry

The raw material powder slurry used in the present invention contains at least a ceramic powder, a thermoplastic resin (binder), and a solvent as essential components and is prepared by adding the ceramic powder to the solvent so as to be contained at 60% by weight or more and 98% by weight or less and the thermoplastic resin (binder) having a glass transition temperature higher than room temperature to the solvent so as to be contained at 2% by weight or more and 40% by weight or less based on the total weight of the ceramic powder and the thermoplastic resin. That is, a raw material powder slurry is prepared by adding the ceramic powder and the thermoplastic resin to a solvent so that the thermoplastic resin is present in an amount of 2% by weight or more and 40% by weight or less based on the total weight of the ceramic powder and the thermoplastic resin Among these, the ceramic powder constitutes the intended ceramic sintered body. The composition thereof is selected in accordance with the intended properties and is not particularly limited in the present invention. In other words, the ceramic powder may be an oxide or a nitride or a fluoride. Furthermore, the present invention can be suitably utilized even when the ceramic powder is a metal-based material such as an intermetallic compound.

For example, in the case of producing a transparent ceramic sintered body for Faraday rotator, examples of a preferable terbium-containing oxide material to be selected may include the following three kinds.

In other words, (i) terbium-containing garnet-type oxide transparent ceramics composed of a sintered body of oxide garnet (TAG-based composite oxide) containing Tb and Al as main components and Sc as another component, (ii) terbium-containing garnet-type oxide transparent ceramics composed of a sintered body of TGG composite oxide having a composition formula of $Tb_3Ga_5O_{12}$, and (iii) terbium-containing bixbyite-type oxide transparent ceramics represented by the following Formula (A).

$$(Tb_xR_{1-x})_2O_3 \quad (A)$$

(In Formula (A), x is $0.4 \leq x \leq 0.7$, and R contains at least one element selected from the group consisting of scandium, yttrium, and a lanthanide element group other than terbium.)

The materials of (i) are further dilated.

The transparent ceramics of (i) are a terbium-containing oxide containing Tb and Al as main components and Sc as another component and have a garnet structure as a structure.

In the garnet structure, it is preferable that the composition ratio of terbium is high since the Faraday rotation angle (Verdet constant) per unit length becomes large. In addition, it is preferable that the composition ratio of aluminum is high since the crystal field of terbium has margin and the distortion of terbium ion is diminished. Furthermore, it is preferable that the composition ratio of aluminum is high since aluminum has the smallest ion radius among the trivalent ions which can be stably present in oxides having a garnet structure, thus the lattice constant of the garnet structure can be decreased while maintaining the composition ratio of terbium ion as it is, and thus the Faraday rotation angle (Verdet constant) per unit length becomes large. Furthermore, it is preferable that the composition ratio of aluminum in the garnet-type oxide is high since the thermal conductivity of the entire system is also improved.

Incidentally, when the cation sites of the entire system are occupied only by terbium and aluminum, the perovskite structure is further stabilized and this causes the generation of a perovskite-type heterogenous phase. Here, scandium (Sc) is a material which has an intermediate ionic radius and thus can be present in the terbium site which constitutes the garnet structure and in some sites of aluminum in the form of a solid solution. Further, scandium (Sc) is also a buffer material which can be present in the form of a solid solution by adjusting the distribution ratio thereof to the terbium site and aluminum site so that the compounding ratio of terbium to aluminum exactly matches to the stoichiometric ratio and thus the energy for generation of crystallites is minimized in a case in which the compounding ratio of terbium to aluminum deviates from the stoichiometric ratio by variation at the time of weighing. For this reason, a sintered body formed of garnet composition single phase can be stably obtained, and scandium is thus an element which is preferably added.

Hence, for example, in the TAG basic composition formula $(Tb_3Al_5O_{12})$, it is preferable to substitute the portion of 0 or more and less than 0.08 in the entire site amount 3 of terbium and the portion of 0 or more and less than 0.16 in the entire site amount 5 of aluminum with scandium (Sc) since the garnet-type structure is further stabilized.

Furthermore, some sites of terbium may be substituted with yttrium and lutetium. Both yttrium and lutetium do not become an obstacle since the ion radiuses are smaller than that of terbium and the garnet structure is further stabilized. Furthermore, both yttrium and lutetium do not become an obstacle even when substituting terbium since the absorption peak thereof is not present in the oscillation wavelength band of 0.9 µm or more and 1.1 µm or less in a general fiber laser system.

The garnet-type oxide materials composed of $Tb_3Ga_5O_{12}$ of (ii) are described.

The present materials are a material which have a garnet structure and are composed of oxides of terbium (Tb) and gallium (Ga). In this structure as well, it is preferable that the composition ratio of terbium is high since the Faraday rotation angle (Verdet constant) per unit length is large. In addition, it is preferable that the composition ratio of gallium is high since the melting point greatly decreases, the production temperature can be lowered, and the cost can be cut down. Furthermore, $Tb_3Ga_5O_{12}$ is preferable since this has been widely adopted as a faraday rotator for fiber laser system and long-term reliability data thereof is accumulated.

The oxide materials which have a bixbyite structure and are represented by Formula (A) of (iii) are described.

The present materials are an oxide material having a sesquioxide-type terbium oxide structure as a skeleton and a structure in which terbium ion sites, namely terbium ions are substituted with a large amount of at least one element selected from the group consisting of scandium, yttrium, and a lanthanide element group other than terbium in a range of 1-x (wherein 0.4≤x≤0.7) in Formula (A).

This structure is a structure in which the terbium ion concentration in the sesquioxide structure is the highest among several terbium oxide structures. For this reason, it is preferable that the composition ratio of terbium is high since the Faraday rotation angle (Verdet constant) per unit length becomes large.

In addition, the Faraday rotation angle (Verdet constant) per unit length can be still maintained high even when some terbium ions are substituted with other ions in a range of 1-x (wherein 0.4≤x≤0.7) in Formula (A), and it is thus preferable that some terbium ions which exhibit absorption are substituted with other ions which do not exhibit absorption since the absorption density derived from terbium ions per unit lattice can be decreased.

In Formula (A), the range of x is preferably 0.4≤x≤0.7 and still more preferably 0.4≤x≤0.6. It is not preferable that x is less than 0.4 since the Faraday rotation angle (Verdet constant) per unit length decreases. In addition, it is not preferable that x exceeds 0.7 since the absorption amount derived from terbium increases to an unignorable level.

The various kinds of transparent ceramic sintered bodies (terbium-containing composite oxide sintered bodies) to be the target of the present invention contain the composite oxides presented above as a main component. Here, "to contain as a main component" means to contain any one of the composite oxides at 90% by weight or more. The content of any one of the composite oxides is preferably 99% by weight or more, more preferably 99.9% by weight or more, still more preferably 99.99% by weight or more, and particularly preferably 99.999% by weight or more.

Furthermore, it is preferable to appropriately add a metal oxide which plays a role as a sintering aid as an auxiliary component. Typical sintering aids include $SiO_2$, $ZrO_2$, $HfO_2$, CaO, BaO, LiF, MgO and the like and carbon (C) and the like other than the metal oxides although it depends on the kind of material. It is preferable to add these in a range of from 0% by weight to 0.5% by weight. It is preferable to add these sintering aids to the terbium-containing oxide sintered body of the main component since it is possible to promote the densification, to diminish the residual bubbles, and to suppress the deposition of heterogenous phase.

The transparent ceramic sintered bodies (terbium-containing composite oxide sintered bodies) to be the target of the present invention are composed of the above main components and auxiliary components but may further contain other elements. Examples of other elements may typically include sodium (Na), phosphorus (P), tungsten (W), tantalum (Ta), and molybdenum (Mo).

The content of other elements is preferably 10 parts by weight or less, more preferably 0.1 part by weight or less, and particularly preferably 0.001 part by weight or less (substantially zero) when the entire amount of Tb is taken as 100 parts by weight.

Here, as a ceramic powder used in the production of the terbium-containing composite oxide sintered bodies, metal powders or aqueous solutions of nitric acid, sulfuric acid, uric acid, and the like of these element groups or oxide powders and the like of a series of the above elements, in which terbium is contained and all the elements for constituting various composite oxide compositions are combined, can be suitably utilized.

Moreover, it is preferable that the purity of the powders is 99.9% by weight or more.

These elements are weighed by predetermined amounts, mixed together, and fired to obtain fired raw materials containing terbium-containing oxides having desired composition, specifically, oxides of an aluminum-based garnet type ((i) described above), a gallium-based garnet type ((ii) described above), and a bixbyite type forming a solid solution with elements other than terbium ((iii) described above) as a main component.

The firing temperature at this time is required to be finely adjusted depending on the composition, and it cannot be unconditionally mentioned, but is preferably at least 900° C. or more and a temperature lower than the temperature for sintering to be subsequently performed and more preferably 1,000° C. or more and a temperature lower than the temperature for sintering to be subsequently performed. Incidentally, adhesion and aggregation may rapidly deteriorate when heating is performed at a certain temperature or more depending on the raw materials. In the case of utilizing such raw materials, it is preferable to carefully adjust the upper limit temperature and to perform firing in a temperature range in which adhesion and aggregation do not deteriorate. In addition, it is not required to be so careful about the rate of temperature rise and the rate of temperature fall at the time of firing, but it is required to pay attention to the retention time. The adhesion and aggregation gradually proceed when the firing retention time is unnecessarily extended. Hence, the upper limit range of the retention time is also required to be carefully selected to some extent.

Incidentally, "to contain as a main component" here refers to that the main peak obtained from the powder X-ray-diffraction results of a fired raw material consists of the diffraction peak derived from the crystal system of the desired material. Incidentally, in a case in which the existence concentration of heterogenous phase is less than 1%, substantially only the pattern derived from the main phase is clearly detected in the powder X-ray diffraction pattern and the pattern derived from the heterogenous phase is often buried almost at the background level.

Subsequently, the fired raw material obtained is pulverized or classified to obtain a ceramic powder in which the particle size distribution is controlled in a predetermined range. The particle size of the ceramic powder is not particularly limited, but it is preferable to select a powder in which the surface of the primary particles does not have a facet surface as much as possible since the sinterability is improved. In addition, it is preferable to subject the raw materials purchased to a pulverization treatment such as wet ball mill pulverization, wet bead mill pulverization, wet jet mill pulverization, and dry jet mill pulverization rather than using the raw materials as they are since it is possible to suppress the generation of coarse particles and coarse air holes and thus to fabricate a dense molded body. Furthermore, with regard to the purity, it is preferable to select a high-purity starting material powder having a purity of 3N or more since densification in the sintering step is promoted and deterioration in various properties caused by impurities can be prevented.

Incidentally, the powder shape at this time is not particularly limited, and for example, square, spherical, and plate-like powders can be suitably utilized. In addition, even a powder subjected to secondary aggregation can be suitably utilized and even a granular powder granulated by a granulation treatment such as a spray drying treatment can be suitably utilized.

Furthermore, the step of preparing these ceramic powders is not particularly limited. Ceramic powders fabricated by a coprecipitation method, a pulverization method, a spray pyrolysis method, a sol gel method, an alkoxide hydrolysis method, and any other synthesis method can be suitably utilized. In addition, the ceramic powders obtained may be appropriately treated using a wet ball mill, a bead mill, a wet jet mill, a dry jet mill, a hammer mill and the like.

Furthermore, various kinds of dispersants may be added during the wet pulverization treatment for the purpose of preventing excessive aggregation of primary particles. In addition, in a case in which the primary particles are amorphous and excessively fluffy or a case in which a starting material which has a large aspect ratio and is bulky such as plate-like and needle-like materials is used, the shape of the primary particles may be arranged by further adding a calcination step after the pulverizing treatment.

There is a case in which plural kinds of ceramic powders are mixed together and molded for the purpose of fabricating a ceramic sintered body having a composite composition. In the present invention, such a mixed ceramic powder may be used.

However, it is preferable to prepare a wet slurry in which the ceramic powders are dispersed in a solvent and to subject this wet slurry to a blending treatment such as wet ball mill mixing, wet bead mill mixing, and wet jet mill emulsification for the purpose of thoroughly mixing the ceramic powders before firing. Furthermore, the plural kinds of starting materials after being mixed may be calcined to cause a phase change into the intended compound.

Moreover, examples of another transparent ceramic sintered body may include a spinel ($MgAl_2O_4$) sintered body. Specifically, the spinel sintered body is a highly transparent spinel sintered body which can be used in a window material for ultraviolet light, a high strength window material for visible region, a window material for infrared light and the like, and several sintering aids are often added to the spinel sintered body for the purpose of improving the transparency. However, lithium fluoride, which is added as the easiest way to improve the sinterability, cannot be used since there is the absorption thereby in the ultraviolet region, instead, magnesium oxide is added preferably in a range of 0.08% by weight or more and 1% by weight or less and more preferably at about 0.1% by weight based on the weight of $MgAl_2O_4$. In addition, it is preferable that the additive is homogeneously and finely dispersed in the base material since the densification is promoted.

Moreover, examples of another transparent ceramic sintered body may include a calcium fluoride/lithium fluoride sintered body. Specifically, the another transparent ceramic sintered body is a highly transparent calcium fluoride sintered body which can be used in an optical lens and the like, and lithium fluoride is added to the highly transparent calcium fluoride sintered body at preferably, 0.08% by weight or more and less than 3% by weight, more preferably 0.08% by weight or more and 1% by weight or less, and particularly preferably about 0.1% by weight based on the weight of calcium for the purpose of improving the transparency. However, lithium fluoride is required to be homogeneously and finely dispersed in calcium fluoride which is the base material. In addition, it is required to be careful since it is difficult to perform homogeneous dispersion and mixing when lithium fluoride is added at 3% by weight or more even if a blending treatment is performed.

Moreover, examples of a silicon nitride-based ceramic sintered body may include one obtained by blending an oxide-based auxiliary (magnesium oxide powder and yttrium oxide powder) with a silicon nitride powder. Specifically, the silicon nitride-based ceramic sintered body is a silicon nitride ceramic sintered body which has a high thermal conductivity and can be utilized for a heat dissipation substrate, and a magnesium oxide powder is added to the silicon nitride ceramic sintered body at preferably 0.01% by weight or more and less than 1% by weight and more preferably 0.05% by weight or more and 0.8% by weight or less based on the weight of silicon for the purpose of improving the thermal conductivity. Moreover, an yttrium oxide powder is added to the silicon nitride ceramic sintered body at preferably 0.01% by weight or more and less than 1% by weight and more preferably 0.05% by weight or more and 0.8% by weight or less based on the weight of silicon for the purpose of improving the insulator pressure and bending strength. It is preferable that these oxide additives are homogeneously and finely dispersed in the base material since the densification is promoted.

It is preferable that these plural kinds of ceramic powders are mixed together and subjected to the preparation of a raw material powder slurry. In the present invention, such a mixed ceramic powder may be used. However, it is preferable to prepare a wet slurry in which the ceramic powders are dispersed in a solvent for raw material powder slurry and to subject this wet slurry to a blending treatment such as wet ball mill mixing, wet bead mill mixing, and wet jet mill emulsification for the purpose of thoroughly mixing the ceramic powders.

The binder added to the raw material powder slurry is a thermoplastic resin having a glass transition temperature higher than room temperature, preferably higher than room temperature by 3° C. or more. The kind of the thermoplastic resin is not particularly limited, but it is preferable to select the thermoplastic resin from among generally used polyvinyl alcohol (glass transition temperature Tg=55° C. to 85° C.; depending on the degree of saponification and the degree of polymerization), polyvinyl acetate (glass transition temperature Tg=25° C. to 40° C.; depending on the degree of saponification and the degree of polymerization), a copolymer of polyvinyl alcohol and polyvinyl acetate (glass transition temperature Tg=30° C. to 80° C.; depending on the degree of saponification and the degree of polymerization), methyl cellulose (glass transition temperature Tg=−90° C. to 120° C.; depending on the degree of hydration and the degree of substitution. In the present invention, the glass transition temperature is adjusted to be higher than room temperature), ethyl cellulose (glass transition temperature Tg=70° C. to 160° C.; depending on the degree of substitution), polyvinyl butyral (glass transition temperature Tg=60° C. to 110° C.; depending on the degree of saponification and the degree of polymerization), polyvinyl propionate (glass transition temperature Tg=10° C. to 45° C.; depending on the degree of saponification and the degree of polymerization. In the present invention, the glass transition temperature is adjusted to be higher than room temperature), and a copolymer of to polyvinyl alcohol and polyvinyl propionate (glass transition temperature Tg=15° C. to 75° C.; depending on the degree of saponification and the degree of polymerization. In the present invention, the glass transition temperature is adjusted to be higher than room temperature). These are preferable since these are all properly equipped with stickiness, the glass transition temperatures thereof are higher than room temperature (or are adjusted to be higher than room temperature, preferably adjusted to be higher than room temperature by 3° C. or more) and are in a range lower than the boiling point of pressing medium (water or oil) in WIP molding to be described later (or are adjusted to be lower than the boiling point, preferably adjusted to be lower than the boiling point by 5° C. or more), and thus it is easy to handle these. Specifically, the glass transition temperature Tg of the thermoplastic resin is preferably 35° C. to 100° C., more preferably 40° C. to 90° C., and still more preferably 45° C. to 85° C.

Incidentally, the glass transition temperature Tg is usually the midpoint glass transition temperature value when the thermoplastic resin is subjected to the measurement by differential scanning calorimetry (DSC). For example, the glass transition temperature Tg is the midpoint glass transition temperature calculated from the change in heat quantity measured under the conditions of a rate of temperature rise of 10° C./min and a measurement temperature of −50° C. to 250° C. by the method conforming to JIS K7121: 1987. Incidentally, in a case in which the moisture in the sample affects the glass transition temperature Tg, the measurement may be performed after the sample is once heated to 150° C. and thus dried.

For the addition of the thermoplastic resin, it is preferable to use one (thermoplastic resin solution) in which the thermoplastic resin is previously dissolved in a solvent, for example, an ethanol solvent so as to have a proper concentration (% by weight) in advance, or to use one (thermoplastic resin dispersion) in which the thermoplastic resin powder of which the concentration (% by weight) is adjusted so as to be a proper numerical value is dispersed in a solvent such as ethanol even if the thermoplastic resin powder is not dissolved but is separated. The concentration of the thermoplastic resin is preferably, for example, 5% by weight to 40% by weight in the thermoplastic resin solution or dispersion.

The amount of the thermoplastic resin added changes depending on the composition and end use of the intended ceramic sintered body as well, and it is thus required to determine the optimum proportion by a preliminary experiment. In the present invention, cast molding is performed using a raw material powder slurry prepared by adding the ceramic powder and the thermoplastic resin as raw material powder components to a solvent and it is thus preferable to improve the shape retaining property at the time of cast molding by increasing the amount of the thermoplastic resin added than in a case in which the granules obtained by spray-drying the raw material powder slurry are subjected to uniaxial press molding or directly to CIP molding. High-quality molded body and sintered body are obtained when the thermoplastic resin is added in an amount to be 2% by weight or more and 40% by weight or less and preferably 3.5% by weight or more and 20% by weight or less based on the total weight of the ceramic powder and the thermoplastic resin, for example, at the time of preparation of the raw material powder slurry.

In other words, as the raw material powder components contained in the raw material powder slurry, the ceramic powder is contained at 60% by weight or more and 98% by weight or less and the thermoplastic resin (binder) is contained at 2% by weight or more and 40% by weight or less, and preferably, the ceramic powder is contained at 80% by weight or more and 96.5% by weight or less and the thermoplastic resin (binder) is contained at 3.5% by weight or more and 20% by weight or less. At this time, the sum of the ceramic powder and the thermoplastic resin is 100% by weight.

In the present invention, the ceramic powder is dispersed in a solvent to form a wet slurry, and the thermoplastic resin is further added to the wet slurry to form a raw material powder slurry.

The selection of the solvent to be used for preparing a slurry of the ceramic powders is also not particularly limited in the present invention. However, generally, one kind selected from water, ethanol, or an organic solvent (alcohols other than ethanol, acetone, and the like) or a mixture of two or more kinds thereof is suitably selected, and ethanol is preferable among these. Incidentally, in the case of selecting water as a solvent, it is preferable to concurrently mix and add a dispersant, a defoaming agent and the like. It is required to find the optimum range of the amount of each of these added at this time through preliminary experiments.

Moreover, it is possible to use either of a solvent in which the thermoplastic resin added as a binder is dissolved or a solvent in which the thermoplastic resin is not dissolved, but it is preferable to select a solvent in which the thermoplastic resin is dissolved.

Upon the preparation of raw material powder slurry, after addition of the thermoplastic resin solution or the thermoplastic resin dispersion to a wet slurry in which the ceramic powder is dispersed in a solvent, it is preferable to further thoroughly stir the mixture by performing ball mill mixing, bead mill mixing, wet jet mill mixing and the like. However, in a case in which a calcination treatment is performed for the purpose of changing the shape and crystallinity of the ceramic powder and the average primary particle diameter, it is required to disperse the ceramic powder in a solvent to form a wet slurry and to further add the thermoplastic resin solution or the thermoplastic resin dispersion to the wet slurry after the calcination treatment in order to prevent thermal decomposition, thermal denaturation, and thermal volatilization.

Incidentally, various kinds of organic additives (excluding a thermoplastic resin as the binder) may be added to the raw material powder slurry used in the present invention for the purpose of improving the quality stability and yield in the subsequent ceramic producing step. In the present invention, these are also not particularly limited. In other words, various kinds of dispersants, lubricants, plasticizers and the like can be suitably utilized. However, as these organic additives, it is preferable to select high-purity types which do not contain unnecessary metal ions. Furthermore, it is required to pay attention to the added amount since some kinds of dispersants have an effect of lowering the glass transition temperature of the thermoplastic resin.

Molding Step

Subsequently, a molding procedure of the ceramic molded body for sintering in the present invention is described.

Cast Molding

First, a cast-molded body in which the raw material powder components are wet-cast into a predetermined shape is obtained using the raw material powder slurry thus prepared.

Here, the cast-molded body is preferably molded through solid-liquid separation by centrifugal cast molding of a slurry (raw material powder slurry) prepared by adding the ceramic powder and the thermoplastic resin as raw material powder components to a solvent. In more detail, the cast-molded body is more preferably a solid component having a predetermined shape obtained by settling the raw material powder slurry, filling the aggregated sediment obtained in the vessel of a centrifugal tube, and subjecting this to a centrifugal separation treatment (centrifugal cast molding).

The centrifugal cast molding machine used for such centrifugal cast molding has the same configuration as a centrifugal separator and is one in which a raw material powder slurry is filled in a vessel to be a die, the vessel is rotated at a high speed, and the raw material powder slurry is separated into a solid and a liquid by the centrifugal force and molded. The centrifugal force in the centrifugal separation treatment at this time is preferably 1,000 G or more and more preferably 2,000 G or more. In addition, the time for centrifugal separation treatment is preferably 20 to 240 minutes and more preferably 30 to 180 minutes.

Subsequently, the cast-molded body obtained is dried preferably at room temperature to 110° C. for 1 to 4 days and more preferably at 40° C. to 75° C. for 2 to 4 days, and a dried cast-molded body containing the raw material powder components is thus obtained.

The shape of the dried cast-molded body corresponds to the intended sintered body shape, and is, for example, a cylindrical shape having a diameter of 10 to 60 mm and a length of 5 to 40 mm. Alternatively, the shape is a cubic shape having a width of 10 to 85 mm, a thickness of 2 to 30 mm, and a length of 10 to 130 mm.

First-Stage Isostatic Press Molding

Next, as first-stage isostatic press molding, the dried cast-molded body thus obtained is directly inserted into a rubber die or vacuum-packed and sealed with a waterproof film, and subjected to isostatic pressing at a temperature lower than the glass transition temperature of the thermoplastic resin contained in the raw material powder components, and a first-stage press-molded body is thus molded.

Here, it is preferable that this first-stage isostatic press molding is cold isostatic press (CIP) molding. In other words, it is preferable to mount the dried cast-molded body which is directly inserted into a rubber die or vacuum-packed and sealed with a waterproof film on the CIP apparatus and to perform the first-stage isostatic press molding. The pressing medium in this case is water or oil.

The applied pressure and pressure retention time at this time change depending on the selected ceramic composition and the intended use of the final product and are thus required to be appropriately adjusted. However, it is difficult to obtain a high-quality sintered body when the applied pressure is not generally increased to 40 MPa or more since the density of the molded body does not increase. The upper limit of the applied pressure is not particularly limited, but it is not preferable to increase the pressure too high since lamination cracking occurs. In most ceramic materials, an applied pressure of 400 MPa or less is often sufficient.

In addition, the pressure retention time is, for example, preferably 1 to 10 minutes and more preferably 1 to 3 minutes.

In addition, the temperature of the molded body at the time of pressing is maintained at a temperature lower than the glass transition temperature of the thermoplastic resin contained in the raw material powder components, and for example, the temperature is preferably maintained at a temperature lower than the glass transition temperature of the thermoplastic resin contained in the raw material powder components by 10° C. or more, and it is particularly preferable to maintain the molded body at room temperature without heating.

Incidentally, in this CIP treatment, it is preferable that the temperature is maintained at a temperature lower than the glass transition temperature of the thermoplastic resin contained in the raw material powder components at the time of pressing since the thermoplastic resin is firmly solidified in the raw material powder in a state of thoroughly (densely) burying the gaps between the ceramic powder (primary particles) in advance, the pressure applied to the surface of the molded body is sequentially transmitted between the hard thermoplastic resin and the hard ceramic powder (primary particles) adjacent to each other when press-molding the raw material powder, and as a result, the pressure is reliably applied to the interior of the molded body.

Second-Stage Isostatic Press Molding Subsequently, the first-stage press-molded body obtained is subjected to warm isostatic pressing (WIP) with heating its body up to a temperature equal to or higher than the glass transition temperature of the thermoplastic resin as the second-stage isostatic press molding, and a ceramic molded body is thus molded.

It is preferable to perform this second-stage isostatic press molding by the following procedure.

Step S1

First, in the WIP apparatus used for WIP molding, the temperatures of the pressurized vessel portion for WIP molding and the pressing medium are raised so as to be equal to or higher than the glass transition temperature of the thermoplastic resin contained in the raw material powder components and stabilized in advance.

Step S2

In the WIP apparatus in such a heated state, the first-stage press-molded body is loaded in a state of being filled in a rubber die or vacuum-packed and sealed with a waterproof film.

Step S3

The first-stage press-molded body is retained while being maintained in the filled state to heat the first-stage press-molded body to a temperature the same as that of the heated WIP apparatus, and then WIP molding is performed as the second-stage isostatic press molding.

Incidentally, in step S3, after the first-stage press-molded body is filled, WIP molding may be performed as the second-stage isostatic press molding while heating the first-stage press-molded body to a temperature the same as that of the WIP apparatus.

Here, the temperature of the pressurized vessel portion for WIP molding and the pressing medium, namely, the temperature at which the first-stage press-molded body is heated is equal to or higher than the glass transition temperature of the thermoplastic resin contained in the raw material powder components and is preferably higher than the glass transition temperature of the thermoplastic resin by 5° C. or more. Incidentally, in a case in which the glass transition temperature of the thermoplastic resin is 50° C. or less, it is preferable to set the temperature at which the first-stage press-molded body is heated to a temperature higher than the glass transition temperature by 10° C. or more. Moreover, it is preferable that the upper limit of the temperature at which the first-stage press-molded body is heated is 130° C. or less.

In addition, the pressing medium to be used is preferably water or oil and more preferably water or oil having a boiling point of more than 100° C. At this time, although the pressing medium varies depending on the kind of thermoplastic resin selected, it is dangerous to utilize water as the pressing medium since there is the possibility of bumping in a case in which the glass transition temperature of the thermoplastic resin is 91° C. or more. Hence, it is preferable to select oil having a boiling point of more than 100° C. as the pressing medium. Incidentally, there are various kinds of oil, and it is thus preferable to appropriately select oil which does not have the risk of bumping even when being heated to the intended temperature.

The applied pressure and pressure retention time in WIP molding change depending on the selected ceramic composition, the kind and added proportion of thermoplastic resin, and the intended use of the final product and are thus required to be appropriately adjusted. However, unless the applied pressure is generally increased to 40 MPa or more, it is difficult for the thermoplastic resin heated to a temperature higher than the glass transition temperature to pass through between the gaps of the packed ceramic molded body and to cause plastic flow, thus raw material rearrangement in the interior of the molded body in a state of being pressed and storing internal stress does not occur in the CIP step, and it is difficult to decrease the residual stress, to close the coarse cavities, and to further densify the molded body. The upper limit of the applied pressure is not particularly limited, but it is generally known that the maximum ultimate pressure of a WIP apparatus is lower than that of a CIP apparatus. This is a limitation in the production of apparatus for safely operating the apparatus, including thermal expansion of the entire apparatus due to temperature rise. Specifically, the maximum applied pressure of a general WIP apparatus is about 200 MPa, but in the present invention, it is possible to sufficiently exert the effect if a pressure at this degree is applied.

In addition, the pressure retention time is, for example, preferably 1 to 10 minutes and more preferably 1 to 3 minutes.

Incidentally, the first-stage isostatic press molding and second-stage isostatic press molding may be performed as follows instead of the embodiments thereof described above.

First-Stage Isostatic Press Molding

The dry cast-molded body is inserted into a rubber die or vacuum-packed and sealed with a waterproof film and mounted on the WIP apparatus and molding is performed under the conditions of first-stage isostatic press molding (fabrication of first-stage press-molded body).

Second-Stage Isostatic Press Molding

After the first-stage press-molded body is molded, heating of the first-stage press-molded body is started while the first-stage isostatic pressing state is maintained (that is, while the first-stage press-molded body is mounted on the WIP apparatus and pressed) and subsequently WIP molding is performed under the conditions of the second-stage isostatic press molding.

In the present invention, it is essential to perform both the first-stage press molding (isostatic press molding at a temperature lower than the glass transition temperature of the thermoplastic resin, preferably CIP molding) step and the second-stage isostatic press molding (WIP molding) step in this order.

For example, in the case of observing the distribution state of the ceramic powder and the binder (thermoplastic resin) in the dry cast-molded body after the cast molding and drying, the ceramic powder and the binder (thermoplastic resin) are in a state in which the ceramic powder and the binder (thermoplastic resin) are relatively uniformly dispersed or a state in which the binder (thermoplastic resin) is present so as to bury the gaps between the ceramic powders, but the density of the molded body is in a relatively low state.

Next, the first-stage press molding (isostatic press molding at a temperature lower than the glass transition temperature of the thermoplastic resin, preferably CIP molding) in the first half of the isostatic press-molding has a function to transmit the applied pressure to the interior of the thick molded body with respect to this dried cast-molded body. At this time, in the first-stage press-molded body, while a state in which the ceramic powder and the binder (thermoplastic resin) are relatively uniformly dispersed in the dried cast-molded body or a state in which the binder (thermoplastic resin) is present so as to bury the gaps between the ceramic powders is maintained, the density of the first press-molded body becomes larger than the density of the dry cast-molded body to a certain extent.

Next, the second-stage isostatic press molding (WIP molding) step in the second half of the isostatic press-molding has a function to eliminate the negative action caused in the first-stage press molding step, that is, to remove the internal stress distortion of the molded body and generation of partial coarse voids by plastic flow and rearrangement in the first-stage press-molded body. At this time, in the ceramic molded body, while a state in which the ceramic powder and the binder (thermoplastic resin) are relatively uniformly dispersed in the first-stage press-molded body or a state in which the binder (thermoplastic resin) is present so as to bury the gaps between the ceramic powders is maintained, the density of the ceramic molded body is still larger than the density of the first-stage press-molded body.

As long as a series of actions by isostatic press molding of these first and second stages correctly work, the range of conditions to be variously set in these two isostatic press molding steps is arbitrary.

However, it is required to confirm and verify that this series of actions correctly work. It is preferable to perform this confirmation and verification by the following method.

In other words, the first confirmation method is to confirm that density $d_{CIP+WIP}$ of molded body>density $d_{CIP}$ of molded body since the density $d_{CIP+WIP}$ of the molded body (ceramic molded body) in which a series of actions by isostatic press molding of these first and second stages have correctly worked after the first-stage press molding step and the second-stage press molding step is necessarily larger than the density $d_{CIP}$ of the molded body immediately after the first-stage press molding step.

In addition, as the second confirmation method is to confirm that density $d_{WIP}$ of molded body<density $d_{CIP+WIP}$ f molded body since the density $d_{WIP}$ of the molded body subjected to only WIP molding is lower than the density $d_{CIP+WIP}$ of the molded body when a sample in which the dried cast-molded body is not subjected to the first-stage press molding but is subjected only to the second-stage press molding (WIP molding) is fabricated for comparison. Incidentally, coarse voids are formed inside the molded body which is not subjected to the first-stage press molding but is subjected only to the second-stage press molding (WIP molding) in this manner.

As described above, according to the method for preparing a ceramic molded body for sintering of the present invention, it is possible to effectively achieve both pressure transmission to the interior of the molded body and plastic flow of the thermoplastic resin when press-molding a ceramic molded body, particularly a thick ceramic molded body, and to obtain a dense ceramic molded body in which the residual voids are significantly small and the residual stress is eliminated Method of Producing Ceramic Sintered Body (Densification Treatment of Ceramic)

The method for producing a ceramic sintered body according to the present invention is to obtain a ceramic sintered body by sintering a ceramic molded body prepared by the method for preparing a ceramic molded body for sintering according to the present invention and further hot isostatic pressing (HIP) the sintered ceramic molded body for further densification.

At this time, the method preferably further comprises the step of degreasing the ceramic molded body before sintering. Moreover, the method preferably further comprises the step of annealing the HIP treated body after the HIP treating.

Specifically, the following treatments are performed.

Degreasing

In the production method of the present invention, a normal degreasing step can be suitably utilized. In other words, it is possible to perform a temperature-programmed degreasing step using a general heating furnace. In addition, the kind of the atmosphere gas at this time is also not particularly limited, and air, oxygen, oxygen-containing mixed gas, hydrogen, fluorine, hydrofluoric acid gas, nitrogen, ammonia gas and the like can be suitably utilized. The degreasing temperature is also not particularly limited, but in a case in which a thermoplastic resin to be added as well as dispersants and other organic substances are added, it is preferable that the temperature is raised to and maintained at a temperature at which all the organic components thereof can be completely decomposed and eliminated.

Sintering

In the production method of the present invention, a general sintering step can be suitably utilized. In other words, a heating and sintering step by a resistance heating method or an induction heating method can be suitably utilized. The atmosphere at this time is not particularly limited, and sintering in various kinds of atmospheres such as an inert gas, oxygen gas, hydrogen gas, fluorine gas, hydrofluoric acid gas, argon gas, nitrogen gas, and ammonia gas or under reduced pressure (in vacuum) is also possible. However, it is preferable to correctly cope with the condition since a favorably compatible gas varies depending on the kind of ceramic material to be handled. For example, it is preferable to select the atmosphere from an oxygen-based gas group or a reduced pressure atmosphere in the case of oxide ceramics, it is preferable to select the atmosphere from fluorine, a hydrofluoric acid-based gas group, inert gases such as argon and nitrogen, or a reduced pressure atmosphere in the case of fluoride ceramics, and it is preferable to select the atmosphere from nitrogen, an ammonia-based gas group, or a reduced pressure atmosphere in the case of nitride ceramics. In addition, it is needless to say that the material selection and air tightness management of the furnace should be thorough in accordance with the kind of gas used.

The sintering temperature in the sintering step of the present invention is required to be appropriately adjusted depending on the selected composition and the crystal system. In general, it is preferable to perform the sintering treatment in a temperature region lower than the melting point of the ceramic material having the intended final composition by several tens to several hundreds degrees. In addition, it is often sufficient that the sintering retention time in the sintering step is several hours. However, the relative density of the sintered body is required to be increased to at least 95% or more unless a porous sintered body is intentionally fabricated. In addition, it is still more preferable that the relative density of the sintered body is increased to 99% or more by performing the sintering treatment for a long time of 10 hours or more since the final transparency of the transparent ceramic sintered body is further improved.

Incidentally, selection of the rate of temperature rise in the sintering step is quite important. It is preferable to select a rate of temperature rise as small as possible, but there are also limitations due to the productivity and cost restriction. Hence, it is preferable that at minimum 100° C./hr can be secured. It is preferable that the rate of temperature rise can be set to a small degree since it is possible to promote the densification, to improve the transparency, and to suppress the segregation and cracking.

Hot Isostatic Pressing (HIP)

In the production method of the present invention, a hot isostatic pressing (HIP) treatment is additionally performed after the sintering step.

Incidentally, as the kind of pressing gas medium at this time, argon, an inert gas such as nitrogen, or Ar—$O_2$ can be suitably utilized. The pressure applied by the pressing gas medium is preferably 50 to 300 MPa and more preferably 100 to 300 MPa. The effect of improving the densification may not be obtained when the pressure is less than 50 MPa, and the densification cannot be further improved, the load on the apparatus is excessive, and the apparatus may be damaged even when the pressure is increased to more than 300 MPa. It is simple and preferable that the applied pressure is 196 MPa or less since the treatment can be performed by a commercially available HIP apparatus at this pressure.

Incidentally, in a case in which the selected sintered body is a fluoride, it is preferable to perform a so-called capsule HIP treatment in which HIP treatment is performed after the sintered body is sealed with a mild steel capsule or the like.

In addition, the temperature (predetermined retention temperature) at the time of HIP treatment is set to be in a range of 1,000° C. to 1,800° C. and preferably 1,100° C. to 1,700° C. It is not preferable that the heat treatment temperature is more than 1,800° C. since the risk increases that the medium gas penetrates into the sintered body or the sintered body and the HIP furnace are melted and adhere to each other. In addition, the effect of improving the densification of the sintered body can be hardly obtained when the heat treatment temperature is less than 1,000° C. Incidentally, the retention time at the heat treatment temperature is not particularly limited, but it is not preferable that the retention time is an excessively long time since defects inside the sintered body are gradually accumulated. Typically, the retention time is suitably set to a range of 1 to 3 hours.

Incidentally, the heater material, the heat insulating material, and the treatment vessel to be used in the HIP treatment are not particularly limited, but graphite or molybdenum (Mo), tungsten (W), and platinum (Pt) can be suitably utilized, and further yttrium oxide, gadolinium oxide, silicon carbide, and tantalum carbide can also be suitably utilized as the treatment vessel. Incidentally, it is preferable that the sintered body is a sintered body group under a relatively low temperature condition in which the HIP treatment temperature is 1,500° C. or less since platinum (Pt) can be used as a heater material, a heat insulating material, and a treatment vessel, the degree of freedom in selection of the atmosphere to be selected increases, and the point defect concentration in the sintered body obtained can be decreased. In addition, graphite is preferable as a heater material and a heat insulating material in a case in which the treatment temperature is 1,500° C. or more.

Annealing

In the production method of the present invention, there is a case in which point defects are generated in the transparent ceramic sintered body obtained after the HIP treatment is terminated and the transparent ceramic sintered body has a light gray or black gray appearance when producing a transparent ceramic sintered body. In such a case, it is preferable to perform an annealing treatment (defect recovery treatment) at a temperature equal to or lower than the HIP treatment temperature, typically 1,000° C. to 1,500° C. in an oxygen atmosphere in the case of an oxide, in a fluorine or hydrofluoric acid atmosphere in the case of a fluoride, and in a nitrogen or ammonia atmosphere in the case of a nitride. The retention time in this case is preferably 3 hours or more since it is required to secure a sufficient time for the recovery of point defects. Incidentally, it is not preferable that the set temperature in the annealing treatment step is increased to more than 1,500° C. or the retention time is excessively extended to several tens hours since bubbles are regenerated here and there in the transparent ceramic material, which is called the rebound phenomenon.

Optical Evaluation

In the production method of the present invention, in the case of producing a transparent ceramic sintered body, it is preferable to optically polish at least one surface for the purpose of evaluating the optical quality of the sintered body which has undergone a series of the production steps described above. The optical surface accuracy at this time is not particularly limited. However, it is difficult to conduct correct optical evaluation when the warpage of the optical surface is too severe, and thus the optical surface accuracy is preferably $\lambda$, or less, more preferably $\lambda/2$ or less, and particularly preferably $\lambda/4$ or less, for example, in a case in which the measurement wavelength $\lambda=633$ nm. Incidentally, it is also possible to further diminish the optical loss by appropriately forming a reflection preventing film on the optically polished surface.

It is possible to observe and evaluate the presence or absence of residual bubbles, coarse cavities, and residual distortion through a crossed Nicol image, and the like by microscopically observing the interior through the optically polished surface in the manner described above.

As described above, according to the method for producing a ceramic sintered body of the present invention, it is possible to fabricate a ceramic sintered body having a truly high density and significantly few residual bubbles, as a result, it is possible to obtain a high-quality ceramic sintered body which exhibits improved mechanical strength, thermal conductivity, optical transparency, electrical characteristics, long-term reliability, and the like and thus exhibits more favorable properties than those in the prior art.

EXAMPLES

Hereinafter, the present invention is more specifically described with reference to Examples and Comparative Examples, but the present invention is not limited to Examples.

Example 1

A terbium oxide powder and a scandium oxide powder manufactured by Shin-Etsu Chemical Co., Ltd. and an aluminum oxide powder manufactured by TAIMEI CHEMICALS CO., LTD. were procured. Furthermore, a liquid of tetraethyl orthosilicate (TEOS) manufactured by KISHIDA CHEMICAL Co., Ltd. was procured. The purities of the powder raw materials were all 99.9% by weight or more, and the purity of the liquid raw material was 99.999% by weight or more.

A raw material for garnet-type oxide (mixed raw material No. 1) having the final composition presented in Table 1 was prepared by using the raw materials and adjusting the mixing ratio thereof.

In other words, a mixed powder in which the molar numbers of terbium and aluminum and scandium were each the molar ratio in the composition presented in Table 1 was prepared by weighing the raw materials. Subsequently, TEOS was weighed and added to the raw material so that the added amount thereof was the percentage by weight (0.01% by weight) presented in Table 1 in terms of $SiO_2$. Thereafter, the mixed powder was dispersed and mixed in ethanol using an alumina ball mill apparatus. The treatment time was 15 hours.

Incidentally, the mixed raw material No. 1 was separately further subjected to a spray drying treatment to fabricate a granular raw material having an average particle diameter of 20 μm. Subsequently, this granular raw material was put in an yttria crucible and fired at 1,200° C. for a retention time of 3 hours using a high-temperature muffle furnace, thereby obtaining a fired raw material. The diffraction pattern of the fired raw material obtained was analyzed (XRD analysis) using a powder X-ray diffractometer manufactured by Malvern Panalytical Ltd., and as a result, this fired raw material was confirmed to be formed only of a garnet single phase (cubic) from the comparison of the measured pattern with the reference data of the X-ray diffraction pattern.

TABLE 1

| Mixed raw material No. | Composition of composite oxide | Sintering aid Composition | Added amount (% by weight) | XRD analysis |
| --- | --- | --- | --- | --- |
| 1 | $(Tb_{0.985}Sc_{0.015})_3(Al_{0.975}Sc_{0.025})_5O_{12}$ | $SiO_2$ | 0.01 | Garnet |

The mixed raw material No. 1 was again dispersed and mixed in ethanol using a nylon ball mill apparatus. The treatment time was 20 hours. The wet slurry thus obtained was divided into two groups, and a thermoplastic resin solution in which a copolymer (glass transition temperature: 48° C.) of polyvinyl alcohol and polyvinyl acetate manufactured by JAPAN VAM & POVAL CO., LTD. as a binder was dissolved in ethanol so as to be 20% by weight was weighed and added to one group so that the copolymer of polyvinyl alcohol and polyvinyl acetate was present in an amount of 4% by weight based on the weight of the entire raw material powder (mixed raw material No. 1+binder), and then the binder-added slurry (raw material powder slurry (1)) was stirred and mixed for 3 hours. The same thermoplastic resin solution was weighed and added to the other group so that the copolymer of polyvinyl alcohol and polyvinyl acetate was present in an amount of 1% by weight based on the weight of the entire raw material powder (mixed raw material No. 1+binder), and then the binder-added slurry (raw material powder slurry (2)) was stirred and mixed for 3 hours. In the raw material powder slurries (1) and (2), the binders were all dissolved in the slurries.

The raw material powder slurries (1) and (2) divided into these two groups were each allowed to still stand for 24 hours to be settled out, thereby aggregated sediments were yielded. The supernatants were each removed, the remaining aggregated sediments were filled in round bottom centrifuge tubes having a diameter of 10 mmϕ and set in a centrifugal separator, and these round bottom centrifuge tubes were rotated at a maximum centrifugal force of 3,000 G for 1 hour (60 minutes) to centrifuge the aggregated sediments filled in the round bottom centrifuge tubes. After completion of centrifugal separation, the supernatants were removed again, and then solid molded bodies (centrifugally cast-molded bodies) were collected. The solid molded bodies collected were oven-dried at 60° C. for 48 hours, thereby obtaining dried cast-molded bodies. The above treatment is called "casting & drying".

The dried cast-molded bodies obtained were further divided into five groups (Example 1-1 and Comparative Examples 1-1 to 1-4) as presented in Table 2. Thereafter, a ceramic molded body sample was fabricated through a molding procedure (three levels of casting & drying-CIP treatment-WIP treatment, casting & drying-CIP treatment, and to casting & drying-WIP treatment) under the conditions presented in Table 2 (in the table, the mark "○" indicates that the pressing treatment is performed and the mark "—" indicates that the pressing treatment is not performed (the same applies hereinafter)).

Incidentally, the room temperature in this molding procedure was 20° C. The CIP conditions were set as follows: pressing medium: water, pressing medium temperature: 20° C., applied pressure: 196 MPa, and pressing time: 2 minutes. In addition, the WIP conditions were set as follows: pressing medium: water, pressing medium temperature: 60° C., CIP molded body heating temperature: 60° C., applied pressure: 196 MPa, and pressing time: 2 minutes.

For the ceramic molded body samples obtained, the weight w (g) of each sample was measured, the diameter r (mm) and the length L (mm) were also measured, and the density of each molded body was determined through calculation by the following equation.

Density of molded body(g/cm$^3$)=(4,000 w)/($\pi r^2 L$)

In addition, the appearance of the ceramic molded body sample was visually observed.

Next, each ceramic molded body was degreased in a muffle furnace under the conditions of 1,000° C. and 2 hours. Subsequently, the degreased ceramic molded body was charged into an oxygen atmosphere furnace, and sintered at 1,730° C. for 3 hours to obtain a sintered body. Furthermore, each sintered body was charged into a HIP furnace made of carbon heater and subjected to a HIP treatment in an Ar atmosphere under the conditions of an applied pressure of 200 MPa, a heating temperature of 1,600° C., and a retention time of 2 hours. Subsequently, each HIP-treated sintered body obtained was charged into an oxygen atmosphere furnace and subjected to an annealing treatment at a heating temperature of 1,350° C. for a retention time of 4 hours to obtain a ceramic sintered body in which oxygen deficiency was recovered.

Each ceramic sintered body thus obtained was ground and polished so as to have a diameter of 5 mm and a length of 15 mm, and further, the optical both end faces of each ceramic sintered body were subjected to final optical polishing to have an optical surface accuracy $\lambda/2$ (a case of measurement wavelength $\lambda$=633 nm), thereby obtaining a sample for evaluation.

Next, the total light transmittance and forward scattering coefficient were measured as follows for each sample. Here, the n number of samples was set to three for each, and the average value of the measurement results was taken as the measured value of each sample (the same applies hereinafter).

Method of Measuring Total Light Transmittance and Forward Scattering Coefficient The total light transmittance at a wavelength of 1,064 nm was measured using a spectrophotometer V-670 manufactured by JASCO Corporation. As the measurement method, first, light (light having a wavelength of 1,064 nm (the same applies hereinafter)) spectrally diffracted by a spectrometer is irradiated without setting the sample for evaluation in the spectrophotometer V-670, the light is received by an integrating sphere set in the apparatus in advance, and a concentrated light is received by a detector. The illuminance obtained is denoted as $I_0$, and then the sample for evaluation is set in the apparatus, and then the spectrally diffracted light is incident on the sample for evaluation this time, and the transmitted light is concentrated again by the integrating sphere and received by the detector. The illuminance obtained is denoted as I, and the total light transmittance was determined by Equation (1).

Furthermore, the forward scattering coefficient was continuously measured. In other words, the setup of the integrating sphere was switched to a mode in which the linear transmitted light was removed, the light spectrally diffracted again in a state in which the sample for evaluation was set was incident on the sample for evaluation, and light other than the linear transmitted light in the transmitted light was concentrated by the integrating sphere and received by the detector. The illuminance obtained is denoted as Is, and the forward scattering coefficient was determined by Equation (2).

Total light transmittance(%/15 mm)=$I/I_0 \times 100$   Equation (1)

Forward scattering coefficient(%/15 mm)=$Is/I_0 \times 100$   Equation (2)

The above results are summarized in Table 2.

TABLE 2

| | Raw material powder*[4] (% by weight) | | Molding procedure | | | Density of molded body (g/cm$^3$) | Appearance of molded body | Total light transmittance (%/15 mm) | Forward scattering coefficient (%/15 mm) |
|---|---|---|---|---|---|---|---|---|---|
| | Mixed raw material No. 1 | Binder*[1] | Casting and drying | CIP*[2] | WIP*[3] | | | | |
| Example 1-1 | 96 | 4 | ○ | ○ | ○ | 3.49 | Without cracking | 84.1 | 0.5 |
| Comparative Example 1-1 | 96 | 4 | ○ | ○ | — | 3.36 | Without cracking | 83.6 | 0.7 |

TABLE 2-continued

| | Raw material powder*[4] (% by weight) | | Molding procedure | | | Density of molded body (g/cm³) | Appearance of molded body | Total light transmittance (%/15 mm) | Forward scattering coefficient (%/15 mm) |
|---|---|---|---|---|---|---|---|---|---|
| | Mixed raw material No. 1 | Binder*[1] | Casting and drying | CIP*[2] | WIP*[3] | | | | |
| Comparative Example 1-2 | 96 | 4 | ○ | — | ○ | 3.41 | Without cracking | 83.0 | 1.0 |
| Comparative Example 1-3 | 99 | 1 | ○ | ○ | ○ | 3.25 | Partial cracking | 81.6 | 1.4 |
| Comparative Example 1-4 | 99 | 1 | ○ | ○ | — | 3.13 | Partial cracking | 81.0 | 1.5 |

*[1]Binder: copolymer of polyvinyl alcohol and polyvinyl acetate (Tg: 48° C.)
*[2]CIP conditions: pressing medium temperature 20° C., applied pressure 196 MPa, and pressing time 2 minutes
*[3]WIP conditions: pressing medium temperature 60° C., applied pressure 196 MPa, and pressing time 2 minutes
*[4]Addition amount of raw material powder component in slurry From the above results, in Example 1-1 in which a molding procedure of casting & drying-CIP treatment-WIP treatment was performed using a raw material powder slurry to which a binder (thermoplastic resin) was added at 4% by weight, the density of molded body was most improved, the total light transmittance after sintering was the highest, and the forward scattering coefficient was the lowest. Even in the case of the raw material powder slurries to which a binder was added in the same manner, in Comparative Examples 1-1 and 1-2 in which a molding procedure of casting & drying-CIP treatment or casting & drying-WIP treatment was performed, the density of molded body hardly increased, the total light transmittance also slightly decreased as compared to that in Example 1-1, and the forward scattering coefficient also deteriorated. Incidentally, from the comparison between Comparative Example 1-1 and Comparative Example 1-2, it has been confirmed that the density of a molded body fabricated under a molding condition of casting & drying-WIP treatment is higher than that of a molded body fabricated under a molding condition of casting & drying-CIP treatment but the molded bodies are inferior in the total light transmittance and the forward scattering coefficient when being sintered. Moreover, in the raw material powder slurries (Comparative Examples 1-3 and 1-4) in to which the amount of binder added was 1% by weight, the density of molded body was a certain degree but cracking occurred at a part of the ceramic molded body and the total light transmittance and the forward scattering coefficient were both not so favorable in both molding conditions of the casting & drying-CIP treatment and the casting & drying-CIP treatment-WIP treatment. It is presumed that this is because most of the specially added binder has been discharged out of the system during casting and drying and the net amount of binder remaining in the molded body has greatly dropped below 1% by weight.

Example 2

A spinel ($MgAl_2O_4$) powder manufactured by TAIMEI CHEMICALS CO., LTD. was procured. The purity thereof was 99.99% by weight or more (denoted as 4N—$MgAl_2O_4$). Furthermore, a magnesium oxide powder manufactured by Ube Material Industies, Ltd. was also procured. The purities thereof was 99.99% by weight or more.

The raw materials were weighed so that the magnesium oxide powder was present in an amount of 0.1% by weight based on the weight of 4N—$MgAl_2O_4$ in terms of MgO, and mixed together to prepare a starting material, and then the starting material was dispersed and mixed in ethanol using an alumina ball mill apparatus. The treatment time was 15 hours. Thereafter, a spray drying treatment was further performed, thereby fabricating a granular raw material having an average particle diameter of 20 μm.

The granular raw material was put in an alumina crucible and fired at 650° C. for a retention time of 3 hours using a muffle furnace, thereby obtaining a fired raw material (fired raw material No. 1). The diffraction pattern of the fired raw material obtained was analyzed (XRD analysis) using a powder X-ray diffractometer manufactured by Malvern Panalytical Ltd., and as a result, this sample was confirmed to be formed only of a spinel single phase from the comparison of the measured pattern with the reference data of the X-ray diffraction pattern.

The fired raw material was again dispersed and mixed in ethanol using an alumina ball mill apparatus. The treatment time was 20 hours. The wet slurry thus obtained was divided into two groups, and a thermoplastic resin solution in which polyvinyl alcohol (glass transition temperature: 60° C.) manufactured by JAPAN VAM & POVAL CO., LTD. was dissolved in ethanol so as to be 20% by weight as a binder was weighed and added to one group so that polyvinyl alcohol was present in an amount of 4% by weight based on the weight of the entire raw material powder (fired raw material No. 1+binder), and then the binder-added slurry (raw material powder slurry (1)) was stirred and mixed for 3 hours. The same thermoplastic resin solution was weighed and added to the other group so that polyvinyl alcohol was present in an amount of 1% by weight based on the weight of the entire raw material powder (fired raw material No. 1+binder), and then the binder-added slurry (raw material powder slurry (2)) was stirred and mixed for 3 hours. In the raw material powder slurries (1) and (2), the binders were all dissolved in the slurries.

The raw material powder slurries (1) and (2) divided into these two groups were each allowed to still stand for 24 hours to be settled out, thereby aggregated sediments were yielded. The supernatants were each removed, the remaining aggregated sediments were filled in round bottom centrifuge tubes having a diameter of 10 mmϕ and set in a centrifugal separator, and these round bottom centrifuge tubes were rotated at a maximum centrifugal force of 2,000 G for 3 hours (180 minutes) to centrifuge the aggregated precipitates filled in the round bottom centrifuge tubes. After completion of centrifugal separation, the supernatants were removed again, and then solid molded bodies (centrifugally cast-molded bodies) were collected. The solid molded bodies collected were oven-dried at 60° C. for 48 hours, thereby obtaining dried cast-molded bodies. The above treatment is called "casting & drying".

The dried cast-molded bodies obtained were further divided into five groups (Example 2-1 and Comparative Examples 2-1 to 2-4) as presented in Table 3. Thereafter, a ceramic molded body sample was fabricated through a molding procedure (three levels of casting & drying-CIP treatment-WIP treatment, casting & drying-CIP treatment, and casting & drying-WIP treatment) under the conditions presented in Table 3.

Incidentally, the room temperature in this molding procedure was 20° C. The CIP conditions were set as follows: pressing medium: water, pressing medium temperature: 20° C., applied pressure: 196 MPa, and pressing time: 2 minutes. In addition, the WIP conditions were as follows: pressing medium: water, pressing medium temperature: 70° C., CIP molded body heating temperature: 70° C., applied pressure: 196 MPa, and pressing time: 2 minutes.

For the ceramic molded body samples obtained, the weight w (g) of each sample was measured, the diameter r (mm) and the length L (mm) were also measured, and the density of each molded body was determined through calculation by the following equation.

Density of molded body(g/cm$^3$)=(4,000 w)/($\pi r^2$L)

In addition, the appearance of the ceramic molded body sample was visually observed.

Next, each ceramic molded body was degreased in a muffle furnace under the conditions of 800° C. and 3 hours. Subsequently, the degreased ceramic molded body was charged into an oxygen atmosphere furnace, and sintered at 1,450° C. for 3 hours to obtain a sintered body. Furthermore, each sintered body was charged into a HIP furnace made of carbon heater and subjected to a HIP treatment in an Ar atmosphere under the conditions of a pressure of 200 MPa, a heating temperature of 1,550° C., and a retention time of 2 hours. Subsequently, each HIP-treated sintered body obtained was charged into an oxygen atmosphere furnace and subjected to an annealing treatment at a heating temperature of 1,100° C. for a retention time of 4 hours to obtain a ceramic sintered body (spinel sintered body) in which oxygen deficiency was recovered.

Each ceramic sintered body thus obtained was ground and polished so as to have a diameter of 5 mm and a length of 15 mm, and further, the optical both end faces of each ceramic sintered body were subjected to final optical polishing to have an optical surface accuracy 212 (a case of measurement wavelength $\lambda$=633 nm), thereby obtaining a sample for evaluation.

For each of the samples thus obtained, the total light transmittance and the forward scattering coefficient were measured under the same measurement conditions as in Example 1. The results attained are summarized in Table 3.

TABLE 3

| | Raw material powder*[5] (% by weight) | | Molding procedure | | | Density of molded body (g/cm$^3$) | Appearance of molded body | Total light transmittance (%/15 mm) | Forward scattering coefficient (%/15 mm) |
|---|---|---|---|---|---|---|---|---|---|
| | Fired raw material No. 1*[1] | Binder*[2] | Casting and drying | CIP*[3] | WIP*[4] | | | | |
| Example 2-1 | 96 | 4 | ○ | ○ | ○ | 2.06 | Without cracking | 85.4 | 0.5 |
| Comparative Example 2-1 | 96 | 4 | ○ | ○ | — | 1.92 | Without cracking | 85.0 | 0.7 |
| Comparative Example 2-2 | 96 | 4 | ○ | — | ○ | 1.98 | Without cracking | 84.5 | 1.0 |
| Comparative Example 2-3 | 99 | 1 | ○ | ○ | ○ | 1.95 | Partial cracking | Un-measurable | Un-measurable |
| Comparative Example 2-4 | 99 | 1 | ○ | ○ | — | 1.94 | Partial cracking | Un-measurable | Un-measurable |

*[1]Fired raw material No. 1: spinel powder + magnesium oxide powder (0.1% by mass of Mg with respect to spinel in terms of MgO)
*[2]Binder: polyvinyl alcohol (Tg: 48° C.)
*[3]CIP conditions: pressing medium temperature 20° C., applied pressure 196 MPa, and pressing time 2 minutes
*[4]WIP conditions: pressing medium temperature 70° C., applied pressure 196 MPa, and pressing time 2 minutes
*[5]Addition amount of raw material powder component in slurry From the above results, in Example 2-1 in which a molding procedure of casting & drying-CIP treatment-WIP treatment was performed using a raw material powder slurry to which a binder (thermoplastic resin) was added at 4% by weight, the density of molded body was most improved, the total light transmittance after sintering was the highest, and the forward scattering coefficient was the lowest. Even in the case of the raw material powder slurries to which a binder was added in the same manner, in Comparative Examples 2-1 and 2-2 in which a molding procedure of casting & drying-CIP treatment and casting & drying-WIP treatment was performed, the density of molded body hardly increased, the total light transmittance also slightly decreased as compared to that in Example 2-1, and the forward scattering coefficient also deteriorated. Incidentally, from the comparison between Comparative Example 2-1 and Comparative Example 2-2, it has been confirmed that the density of a molded body fabricated under a molding condition of casting & drying-WIP treatment is higher than that of a molded body fabricated under a molding condition of casting & drying-CIP treatment but the molded bodies are inferior in the total light transmittance and the forward scattering coefficient when being sintered. Moreover, in the raw material powder slurries (Comparative Examples 2-3 and 2-4) in which the amount of binder added was 1% by weight, the ceramic molded body cracked and it was not possible to measure the total light transmittance and the forward scattering coefficient in both molding conditions of the casting & drying-CIP treatment and the casting & drying-CIP treatment-WIP treatment. In other words, it is considered that this is because the shape retaining property of ceramic molded body is insufficient when the amount of binder added is 1% by weight as discussed in Example 1.

As described above, as presented in the present Examples, upon molding of a ceramic powder, it is possible to fabricate a dense and favorable ceramic molded body in which the residual voids are significantly small and the residual stress is eliminated as a raw material powder slurry is prepared by adding a thermoplastic resin as a raw material powder component at 2% by weight or more and 40% by weight or less in advance, a cast-molded body is fabricated by wet-casting this raw material powder slurry, dried, and then subjected to cold isostatic press (CIP) molding at room temperature lower than the glass transition temperature of the thermoplastic resin, and then the CIP molded body is subjected to warm isostatic press (WIP) molding while being heated at a temperature equal to or higher than the glass transition temperature of the thermoplastic resin. In addition, it is possible to fabricate a ceramic sintered body having a truly high density and significantly few residual bubbles by performing a sintering treatment using this ceramic molded body. As a result, it is possible to provide a high-quality ceramic sintered body which exhibits improved optical transparency, mechanical strength, and thermal conductivity and thus exhibits more favorable properties than those in the prior art.

Incidentally, the present invention has been described using the above embodiment, but the present invention is not limited to this embodiment and can be modified, such as other embodiments, additions, modifications, and deletions, within the scope of those skilled in the art, and any aspect is within the scope of the present invention as long as the effects of the present invention are exerted.

Japanese Patent Application Nos. 2018-092085 and 2019-073264 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a ceramic molded body for sintering which is molded by isostatic pressing a raw material powder containing a ceramic powder which is oxide, nitride, fluoride, or a metal-based material, and a thermoplastic resin having a glass transition temperature higher than room temperature into a predetermined shape, the method comprising the steps of:
preparing a raw material powder slurry by adding the ceramic powder and the thermoplastic resin to a solvent so that the thermoplastic resin is present in an amount of 2% by weight or more and 40% by weight or less based on the total weight of the ceramic powder and the thermoplastic resin;
molding a cast-molded body by wet-casting the raw material powder slurry into a predetermined shape and drying;
molding a first-stage press-molded body by isostatic pressing the dried cast-molded body at a temperature lower than the glass transition temperature of the thermoplastic resin, as first-stage isostatic press molding; and
molding a ceramic molded body by warm isostatic pressing (WIP) the first-stage press-molded body with heating its body up to a temperature equal to or higher than the glass transition temperature of the thermoplastic resin, as second-stage isostatic press molding.

2. The method according to claim 1, wherein the first-stage isostatic press molding is cold isostatic press (CIP) molding.

3. The method according to claim 1, wherein after molding the first-stage press-molded body, heating of the first-stage press-molded body is started while a first-stage isostatic pressing state is maintained and subsequently WIP molding is performed as the second-stage isostatic press molding.

4. The method according to claim 1, wherein a pressing medium in the WIP molding is water or oil.

5. The method according to claim 1, wherein the thermoplastic resin has a glass transition temperature higher than room temperature and lower than a boiling point of a pressing medium in WIP molding.

6. The method according to claim 1, wherein the thermoplastic resin is at least one selected from the group consisting of polyvinyl alcohol, polyvinyl acetate, a copolymer of polyvinyl alcohol and polyvinyl acetate, methyl cellulose, ethyl cellulose, polyvinyl butyral, polyvinyl propionate, and a copolymer of polyvinyl alcohol and polyvinyl propionate.

7. The method according to claim 1, wherein the cast-molded body is molded through solid-liquid separation of the raw material powder slurry by centrifugal cast molding.

8. The method according to claim 1, wherein the raw material powder slurry is prepared by preparing a wet slurry in which the ceramic powder is dispersed in a solvent and subjecting the wet slurry to a blending treatment of wet ball mill mixing, wet bead mill mixing or wet jet mill emulsification, and thereafter adding the thermoplastic resin to the wet slurry.

9. The method according to claim 1, wherein the solvent is one kind selected from water, ethanol and acetone, or a mixture of two or more kinds thereof.

10. The method according to claim 1, wherein the drying of the cast-molded body is at room temperature to 110° C. for 1 to 4 days.

11. The method according to claim 1, wherein the drying of the cast-molded body is at 40° C. to 75° C. for 2 to 4 days.

12. The method according to claim 1, wherein the temperature at which the first-stage press-molded body is heated for the WIP is higher than the glass transition temperature of the thermoplastic resin by 5° C. or more, and if the glass transition temperature of the thermoplastic resin is 50° C. or less, the temperature is higher than the glass transition temperature by 10° C. or more.

13. The method according to claim 1, wherein a pressure holding time for the first-stage isostatic press molding is from 1 to 10 minutes and the temperature of the molded body at the time of the pressing is maintained at a temperature lower than the glass transition temperature of the thermoplastic resin by 10° C. or more.

14. The method according to claim 1, wherein the cast-molded body has a cylindrical shape with a diameter of 10 to 60 mm and a length of 5 to 40 mm, or a cuboid shape having a width of 10 to 85 mm, a thickness of 2 to 30 mm and a length of 10 to 130 mm.

15. The method according to claim 1, wherein the ceramic powder is
(i) TAG-based composite oxide containing Tb and Al as main components and Sc as another component,
(ii) TGG composite oxide having a composition formula $Tb_3Ga_5O_{12}$, or
(iii) bixbyite-type oxide ceramics represented by the following Formula (A):

$$(Tb_xR_{1-x})_2O_3 \quad (A)$$

wherein x is $0.4 \leq x \leq 0.7$ and R contains at least one element selected from scandium, yttrium, and lanthanide group elements other than terbium.

16. The method according to claim 1, wherein the ceramic powder is $MgAl_2O_4$ to which magnesium oxide is added at 0.08% by weight or more and 1% by weight or less, based on the weight of $MgAl_2O_4$.

17. The method according to claim 1, wherein the ceramic powder is calcium fluoride to which lithium fluoride is added at 0.08% by weight or more and less than 3% by weight, based on the weight of calcium.

18. The method according to claim 1, wherein the ceramic powder is a blend of magnesium oxide powder and yttrium oxide powder with silicon nitride powder, magnesium oxide powder being added at 0.01% by weight or more and less than 1% by weight based on the weight of silicon, and yttrium oxide powder being added at 0.01% by weight or more and less than 1% by weight based on the weight of silicon.

19. A method for producing a ceramic sintered body, the method comprising the steps of preparing a ceramic molded body according to the method of claim 1, sintering the ceramic molded body in an inert atmosphere or in a vacuum, and further hot isostatic pressing (HIP) the sintered ceramic molded body.

20. The method according to claim 19, further comprising the step of degreasing the ceramic molded body before sintering.

21. The method according to claim 19, further comprising the step of annealing the HIP treated body after the HIP treating.

22. The method according to claim 19, wherein the ceramic sintered body is a transparent terbium-containing composite oxide sintered body for a Faraday rotator, a transparent spinel sintered body, a transparent calcium fluoride/lithium fluoride sintered body or a silicon nitride-based ceramic sintered body.

* * * * *